(12) United States Patent
Smith

(10) Patent No.: US 9,044,104 B2
(45) Date of Patent: Jun. 2, 2015

(54) CHILD SUPPORT APPARATUS

(71) Applicant: Mamas and Papas (Holdings) Limited, Yorkshire (GB)

(72) Inventor: Peter Smith, Leeds (GB)

(73) Assignee: MAMAS & PAPAS (HOLDINGS) LIMITED, Huddersfield (GB)

( * ) Notice: Subject to any disclaimer, the term of this patent is extended or adjusted under 35 U.S.C. 154(b) by 0 days.

(21) Appl. No.: 13/788,069

(22) Filed: Mar. 7, 2013

(65) Prior Publication Data

US 2013/0234476 A1    Sep. 12, 2013

(30) Foreign Application Priority Data

Mar. 8, 2012 (GB) .................................. 1204140.6

(51) Int. Cl.
  *B62B 7/08*  (2006.01)
  *A47D 1/02*  (2006.01)
  *E05D 7/00*  (2006.01)
  *B62B 7/06*  (2006.01)

(52) U.S. Cl.
  CPC .. *A47D 1/02* (2013.01); *E05D 7/00* (2013.01); *Y10T 16/546* (2015.01); *B62B 7/08* (2013.01); *B62B 2205/20* (2013.01); *B62B 2205/26* (2013.01); *B62B 7/062* (2013.01); *B62B 7/064* (2013.01)

(58) Field of Classification Search
  CPC ........ B62B 7/08; B62B 2205/20; B62B 7/06; B62B 7/064; B62B 7/066
  USPC ................. 280/639, 642, 647, 648, 650, 658, 280/47.38
  See application file for complete search history.

(56) References Cited

U.S. PATENT DOCUMENTS

| | | | | |
|---|---|---|---|---|
| 4,544,178 | A * | 10/1985 | Al-Sheikh et al. | 280/642 |
| 6,238,125 | B1 * | 5/2001 | Lin | 403/102 |
| 6,267,405 | B1 | 7/2001 | Chen | |
| 6,312,005 | B1 * | 11/2001 | Lin | 280/647 |
| 6,416,077 | B1 * | 7/2002 | Chen et al. | 280/642 |
| 6,523,853 | B1 * | 2/2003 | Cheng | 280/642 |
| 6,682,090 | B2 * | 1/2004 | Chen | 280/642 |
| 8,444,170 | B2 * | 5/2013 | Chen et al. | 280/642 |
| 8,485,547 | B2 * | 7/2013 | Hsu | 280/647 |
| 8,672,341 | B2 * | 3/2014 | Offord | 280/650 |
| 8,696,015 | B2 * | 4/2014 | Karremans et al. | 280/642 |
| 8,696,016 | B2 * | 4/2014 | Homan et al. | 280/647 |
| 2003/0164606 | A1 | 9/2003 | Chen | |
| 2011/0272923 | A1 | 11/2011 | Chen | |

FOREIGN PATENT DOCUMENTS

| | | |
|---|---|---|
| GB | 2474359 A | 4/2011 |
| GB | 2483307 A | 3/2012 |

* cited by examiner

*Primary Examiner* — J. Allen Shriver, II
*Assistant Examiner* — Emma K Frick
(74) *Attorney, Agent, or Firm* — Gordon & Jacobson, PC

(57) ABSTRACT

An apparatus for seating a child comprising a seat and a foldable frame for supporting the seat. The frame comprises on left and rights sides: a first and a second frame member connected by a hinge assembly and relatively pivotal through substantially 180 degrees between an unfolded condition and a folded condition, and a third frame member connected to the hinge assembly and pivotal relative to the first and second frame members by less than 180 degrees between an unfolded condition and a folded condition. The first and second frame members are aligned and on opposite sides of the hinge assembly when unfolded and parallel and on the same side of the hinge assembly when folded. The third frame member is parallel with the first and second frame members when folded to provide a compact folded apparatus.

15 Claims, 10 Drawing Sheets

CHILD SUPPORT APPARATUS

CROSS-REFERENCE TO RELATED APPLICATION(S)

The present application claims priority from GB Patent Application No. GB1204140.6, filed on Mar. 8, 2012, entitled "Child Support Apparatus," herein incorporated by reference.

BACKGROUND OF THE INVENTION

1. Field of the Invention

The present invention relates to an apparatus, such as a buggy or highchair, comprising a seat for seating a child and a frame which can be folded and unfolded. The present invention also relates to a hinge assembly of such an apparatus.

2. State of the Art

There are many known buggies (which are commonly referred to as a "baby carriage" or "carriage" in the United States) and other child support apparatus (such as strollers and high chairs) having different frames which can be folded and unfolded. The members of the frame are typically hinged together to allow folding and it is important to avoid the formation of a finger trap in gaps between pivoting members particularly at the hinges where lever action causes the greatest forces. Recently, known buggies have avoided the formation of finger traps but can suffer from an unattractive appearance as a result. The unattractive appearance results from a bulbous hinge assembly or by misalignment between frame members when the buggy is in use.

SUMMARY OF THE INVENTION

The present invention aims to provide an improved child support apparatus.

According to the present invention there is provided apparatus for seating a child comprising a seat and a foldable frame for supporting the seat, the frame comprising: a first and a second frame member connected by a hinge assembly and relatively pivotal through substantially 180 degrees between an unfolded condition and a folded condition by pivotal movement of the first frame member over the hinge assembly; and a third frame member connected to the hinge assembly and pivotal relative to the first and second frame members by less than 180 degrees between an unfolded condition and a folded condition; wherein the hinge assembly comprises: a first hinge part fixed to the first frame member and a second hinge part fixed to the second frame member, the first and second hinge parts being arranged to pivot about a first eccentrically mounted pivot pin which is sufficiently off-set above an axis of the first and second frame members to allow the first and second frame members to pivot between an unfolded condition in which the first and second frame members are generally aligned and located on opposite sides of the hinge assembly and a folded condition in which the first and second members are generally parallel and located on the same side of the hinge assembly; and a third hinge part fixed to the third frame member and arranged to pivot about a second pivot pin which is sufficiently off-set from the first pivot pin to allow pivotal movement of the third frame member relative to the first and second frame members between an unfolded condition in which the third frame member is angled relative to the first and second frame members and a folded condition in which the third frame member is generally parallel with the first and second frame members and located on the same side of the hinge assembly as the first and second frame members.

The present invention further provides a hinge assembly of such a child support apparatus.

BRIEF DESCRIPTION OF THE DRAWINGS

In order that the invention may be more clearly understood, reference will now be made to the accompanying drawings, given by way of example only, in which.

DETAILED DESCRIPTION OF THE PREFERRED EMBODIMENTS

Figure 1:
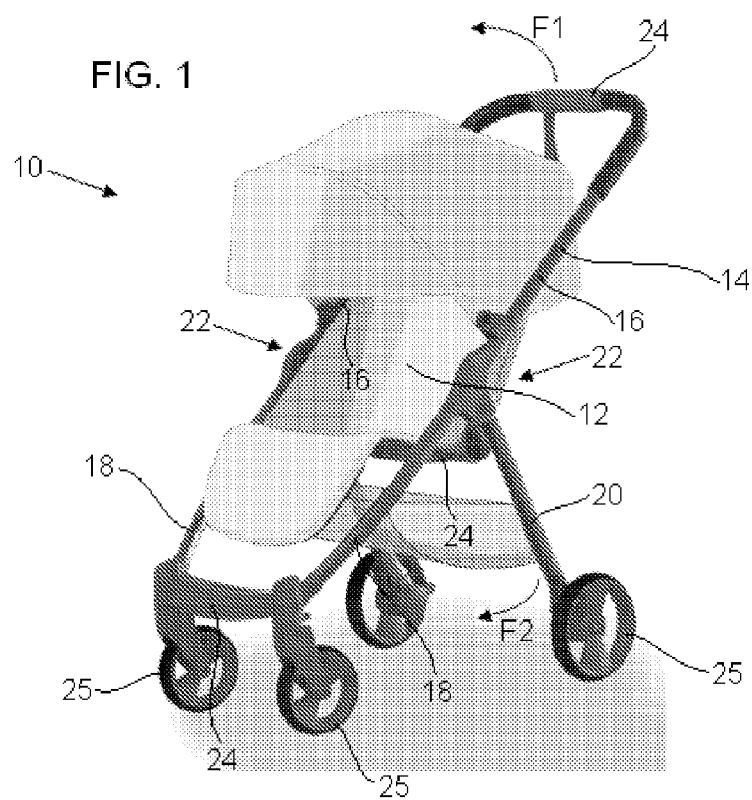
FIG. 1 shows a child support apparatus in an unfolded condition.

Referring to FIG. 1, a buggy 10 is shown for seating a child comprising a seat 12 and a foldable frame 14 for supporting the seat. A buggy is one example of a child support apparatus and other examples include strollers and highchairs.

The frame 14 comprises three members 16, 18, 20 on each of the left and right side of buggy. In this example, first members 16 are handle members, second members 18 are front legs and third members 20 are rear legs. The three members on each side of the buggy are connected by left and right hinge assemblies 22. Cross members 24 link the left and right sides of the buggy. Wheels 25 are provided at the lower ends of the front and rear legs. Two such wheels are shown at the front of the buggy although in another arrangement there is only one front wheel.

The left and right sides are generally symmetrical about a central plane of the buggy shown in FIG. 1 and the buggy has a two dimensional folding mechanism meaning that the left and right sides of the buggy are spaced apart by the same distance in an unfolded condition and a folded condition. Therefore, for the purposes of explaining the folding mechanism, reference need only be made to either the left or right side since the other side will fold in a similar manner. Whilst not specifically shown, the invention also covers child support apparatus with a three dimensional fold in which the lateral dimension is reduced during folding.

Figure 2:
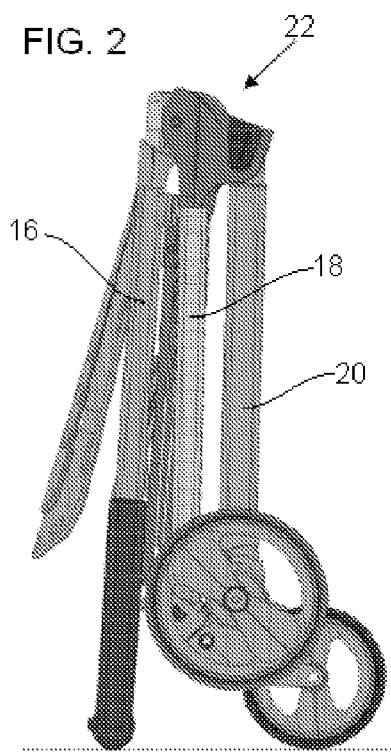
FIG. 2 shows the child support apparatus in a folded condition.

FIG. 2 shows the buggy 10 in a folded condition as viewed from the left side. The arrangement of the hinges 22 allow the buggy to be folded so that the three members 16, 18, 20 lie parallel one to the other and are located on one side of the hinge. The handle members and the rear legs are pivoted towards the front legs and the handle members lie on opposite side of the front legs to the rear legs. This parallel arrangement allows the folded buggy to be compact and therefore convenient for transportation and storage.

As shown in FIG. 1, the buggy frame can be folded with two simple movements. When the frame is unlocked, the handle members 16 can be folded forwards over the hinge assembly with the buggy in a normal, upright orientation and from the perspective of someone pushing the buggy, as indicated by arrow F1. The handle members are pivoted relative to the front legs 18 by approximately 180 degrees until they lie generally parallel with the front legs. The specific angle of rotation need not be exactly 180 degrees and may be around 170 to 185 degrees. The rear legs 20 which lie at approximately 90 degrees to both the handle members and front legs are then moved or allowed to swing under the hinge assembly towards the front legs in an opposite rotational direction as shown by arrow F2 until they lie generally parallel with the front legs. As will be explained in more detail below, the action of folding the handle members unlocks the rear legs for folding, therefore in this arrangement, the handle members must be folded before the rear legs. Unfolding of the frame members can take place in any order. When unfolding the buggy, the handle members and the rear legs are simply pivoted back to their unfolded conditions shown in FIG. 1.

When the rear legs 20 are unlocked, they can swing freely under gravity to the folded condition or can be moved manually. In a preferred arrangement, a cross-bar 24 extends between the hinge assemblies 22, and once the rear leg is unlocked, a user can pick up the buggy by the cross-bar allowing the rear leg to fold under gravity. Accordingly, from the perspective of the user, a single folding step is required to fold the buggy, namely that once the handles are folded, a user then simply picks up the buggy and the remaining folding step occurs automatically.

As well as constituting a simple and quick folding mechanism, the buggy 10 also helps to keep the material of the seat 12 free of dirt when the buggy is in the folded condition. In this regard, the seat has a back rest for supporting the back of a child and a seat base for supporting the legs of a child. The seat may be formed for example by hanging a fabric from the frame or by moulded plastics components. The seat back and base comprises a material which is adjacent to a child when seated in the buggy and when the handle members 16 are folded over towards the front legs 18, the outer surface of the seat back is folded against the outer surface of the seat base thereby protecting the outer surfaces of the seat from becoming dirtied. As the handle members are parallel to the front legs in the folded condition the seat back is firmly pressed against the seat base to prevent the outer surfaces being exposed.

Figure 3:
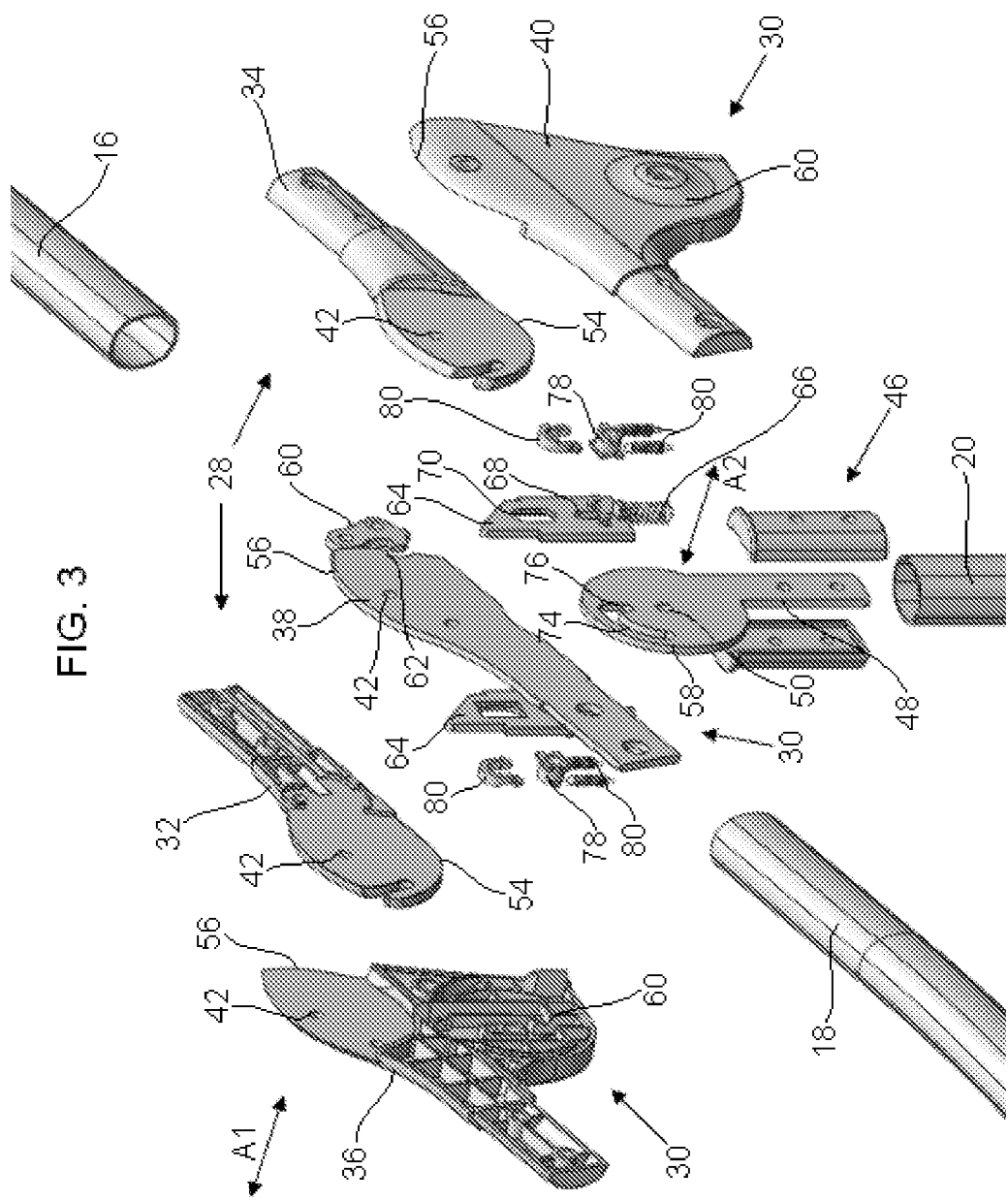
FIG. 3 shows an exploded view of a hinge assembly of child support apparatus.

The hinge assemblies 22 of the buggy will now be described with reference to FIGS. 3 to 10. FIG. 3 shows an exploded view of one of the hinge assemblies 22 and FIGS. 4 to 10 show different stages of the folding and unfolding process.

A first hinge part 28 is fixed to the first frame member 16 and a second hinge part 30 is fixed to the second frame member 18. The frame members and hinge parts may be integral but the illustrated arrangement provides ease of manufacturing. The hinge part 28 comprises a plurality of first hinge portions 32, 34 which are joined together to form a generally cylindrical end that is fixed inside the first frame member 16 by suitable fixings. The second hinge part comprises a plurality of second hinge portions 36, 38, 40 which are joined together to form a generally cylindrical end that is fixed inside the second frame member 18 by suitable fixings. The first and second hinge portions 32, 34, 36, 38, 40 have respective openings 42 for receiving a first pivot pin 44 (see FIGS. 4 to 10) to allow relative pivotal movement of the first and second hinge parts between unfolded and folded conditions.

The first and second hinge parts 28, 30 are arranged so that the pivotal axis extending along A1 is sufficiently off-set above the longitudinal axes L1, L2 of the first and second frame members (see FIG. 4) to allow the first and second frame members to pivot between an unfolded condition in which the first and second frame members are generally aligned and located on opposite sides of the hinge assembly (as shown in FIG. 1) and a folded condition in which the first and second members are generally parallel and located on the same side of the hinge assembly (as shown in FIG. 2). The longitudinal axis of the first and second frame members extends along a centre line of the generally cylindrical members and the pivotal axis A1 is off-set above the longitudinal axis when the buggy is in a normal upright orientation to allow the longitudinal axis of each member to be spaced apart but parallel when pivoted through 180 degrees. In a case where the pivotal axis is not off-set, the hinge parts would typically abut against each other after pivotal movement through about 150 or 160 degrees. If the pivotal axis were offset below the longitudinal axis of the frame members the handle members could not pivot over the hinge assembly towards the front legs.

A third hinge part 46 is fixed to the third frame member 20 and has a generally cylindrical end that is fixed inside the third frame member by suitable fixings. The third hinge part comprises a hinge portion 48 having an opening 50 for receiving a second pivot pin 52 (shown in FIGS. 4 to 10). The pivotal axis A2 of the second pivot pin is sufficiently off-set from the first pivotal axis A1 to allow pivotal movement of the third frame member 20 relative to the second frame member 18 between an unfolded condition (shown in FIG. 1) in which the third frame member is angled (between an angle of about 40 to 120 degrees) relative to the second frame member and a folded condition in which the third frame member is generally parallel with the second frame member and located on the same side of the hinge assembly as the first and second frame members (as shown in FIG. 2).

The hinge portions 32, 34 of the first hinge part 28 have asymmetric profiles, or outer perimeter surfaces, 54 when viewed in the pivotal axis direction A1. That is, the extent of the profiles 54 below the axis A1 is greater than the extent above the axis as viewed in FIG. 3 so that the pivot pin is eccentrically mounted within the profile. Likewise, hinge portions 36, 38, 40 of the second hinge part 28 have asymmetric profiles 56 when viewed in the pivotal axis direction A1. That is, the pivot axis A1 is located above the longitudinal axes L1, L2 when the apparatus is upright and unfolded so the extent of the profiles 56 below the axis A1 is greater than the extent above the eccentric axis as viewed in FIG. 3. This eccentric mounting allows the handle members to pivot over the hinge assemblies towards the front legs so that they are generally parallel.

The profiles 54, 56 are planar and are parallel to the longitudinal axes L1, L2 of the aligned first and second members and perpendicular to the pivotal axis A1. This arrangement allows the hinge portions to slide over each other when pivoting from an orientation in which the profiles fully overlapping condition when the buggy is unfolded to a partially overlapping condition of the profiles when the buggy is folded. Particular as each of the first and second hinge parts comprise a plurality of hinge portions, the overlapping arrangement gives strength to the hinge assembly to resist torsion, bending and shear forces, and is strongest when the buggy is unfolded when typically the forces encountered are greatest. When assembled together the profiles 54, 56 are arranged alternately in an axial direction A1 of the first pivot pin and this arrangement allows each individual profile to be thin without compromising the overall strength of the hinge provided by multiple profiles on each hinge part.

When folded, the larger extent of the profiles 54, 56 extend away from each other on opposite side of the first pivot pin 44 exposing gaps between the profiles of at least the first hinge part. As the profiles are thin, it avoids the generation of a finger trap during pivotal movement. According to current child safety regulations (e.g. EN1888, ASTM F833, ASNZ 2088, SOR 85379, EN 14988, ASTM F404, EN12790, and ASTM F2167-10) or as changed from time to time, a finger trap may be generated in space greater than 5 mm and therefore the thickness of the profiles is preferably less than 5 mm.

Accordingly, the arrangement of first and second hinge parts 28, 30 avoids generation of a finger trap and provides strength to the hinge assembly whilst allowing pivotal movement of first and second frame members 16, 18 from an aligned condition in use through 180 degrees to a folded condition without providing an overly large or bulbous hinge.

In another example, one of the hinge parts 28 and the other of the hinge parts may comprise a single hinge portion arranged alternately with, or sandwiched between, two hinge portions of the other hinge part. Since the previously discussed arrangement of a plurality of hinge portions of each hinge is principally for strength, a single hinge portions could be used as an alternative if it were made from a strong material such as a metal.

Whilst the first and second hinge parts 28, 30 have asymmetric profiles, the hinge portion 48 of the third hinge part has a concentric, circular, profile 58. The profile 58 is planar extending parallel to the longitudinal axis of at least the third frame member and perpendicularly to the second pivotal axis A2. The third profile is arranged alternately with the second hinge portions 36, 40 of the second hinge part in an axial direction of the second pivot pin. The second hinge portions 36, 40 form a housing 60 which fully overlaps the third profile 58. As the second pivotal axis A2 is sufficiently off-set from the first pivotal axis A1, the hinge profile 58 and corresponding housings 60 can be concentric whilst still allowing the third frame member 20 to be parallel with the other frame members in the folded condition shown in FIG. 2. A concentrically shaped profile is larger and more bulbous but because the third frame member is not aligned with the first and second frame members in the unfolded condition, the shape of the profile is not pronounced. The concentric profile provides greater strength than the asymmetric profiles 38, 56 and therefore a single third profile is sufficient to provide adequate hinge strength. Additional third hinge portions may be provided if it is necessary to provide increased strength.

When the buggy is unfolded and in use the frame members 16, 18, 20 are locked to prevent pivotal movement. In the preferred example shown, the first and second frame members 16, 18 are unlocked and folded, and folding of the first and second frame members unlocks the third frame member 20 for pivotal movement.

A hook member 60 is pivotally supported on the first hinge part 28 and biased into engagement with a recess 62 in the profile 56 of the second portion 38 of the second hinge part to lock the first and second frame members 16, 18. A cable (not shown) is connected between the hook member and the handle to allow the latch to be released and the first and second frame members to be folded. Other locking mechanisms will be apparent to those skilled in the art.

The asymmetric profile 54 of the first hinge part 28 about the first pivot pin 44 forms a cam arrangement and pivotal movement of the first and second hinge parts increases the spacing between the asymmetric profile and the second pivot pin 52 during unfolding and decreases the spacing during folding. The asymmetric profile is co-operable with a locking arrangement for locking pivotal movement of the third hinge part, the locking arrangement being responsive to the variation in spacing between the asymmetric profile and the second pivot pin.

In the illustrated example, the locking arrangement comprises a sliding member 64, 64 comprising two parts located on either side of the third hinge portion 48 and received for linear sliding movement in guides in the second hinge portions 36, 40. Two biasing members comprising compression springs 66 seated in the second hinge portions 36, 40 bias the sliding member towards the asymmetric profile, similarly to a cam follower. The sliding members 64 each have two elongate slots 68, 70 of approximately equal length and orientated in the direction of sliding movement. The first slots 68 receive the second pivot pin 52 and limit the extent of sliding movement between a first position (a lower position as viewed in FIG. 3) and a second position (an upper position). The second slots 70 receive a locking pin 72 (shown in FIGS. 4 to 10) and allow movement of the locking pin between a first (lower) position and a second (upper) position. In this way and as described in more detail below, the locking pin can be in either its first or second positions irrespective of the position of the sliding member.

The locking pin 72 extends through the second elongate slots 70 and through a guide channel 74 of the third hinge portion 48. The guide channel is generally arcuate relative to the center of pivotal movement at axis A2. A locking recess 76 extends radially from the arcuate section of the channel and in this example extends towards the axis A2. The locking pin travels along the guide channel during pivotal movement the third frame member 20. The pin engages in the locking recess for locking pivotal movement and is located at the distal end of the guide channel in the folded condition of the third frame member.

The locking pin is carried by pin housings, which in the illustrated example comprise two components 78, 80. The pin housings comprise two components for ease of manufacture, although a single component could be used as an alternative. Cylindrical components 78 receive the locking pin 72 along their lengths and inverted U-shaped components partially surround the cylindrical components and provide hooks onto which tension springs 80 are fastened. The springs are carried by the sliding members and opposing ends of the springs 80 are fixed to hooks on the sliding member 64. The springs 80 bias the locking pin towards the first, lower, position in the elongate slots 70 of the sliding members.

The hinge assemblies 22 will now be described with reference to FIGS. 4 to 10 which show one such assembly in various different stages of folding and unfolding.

Figure 4:
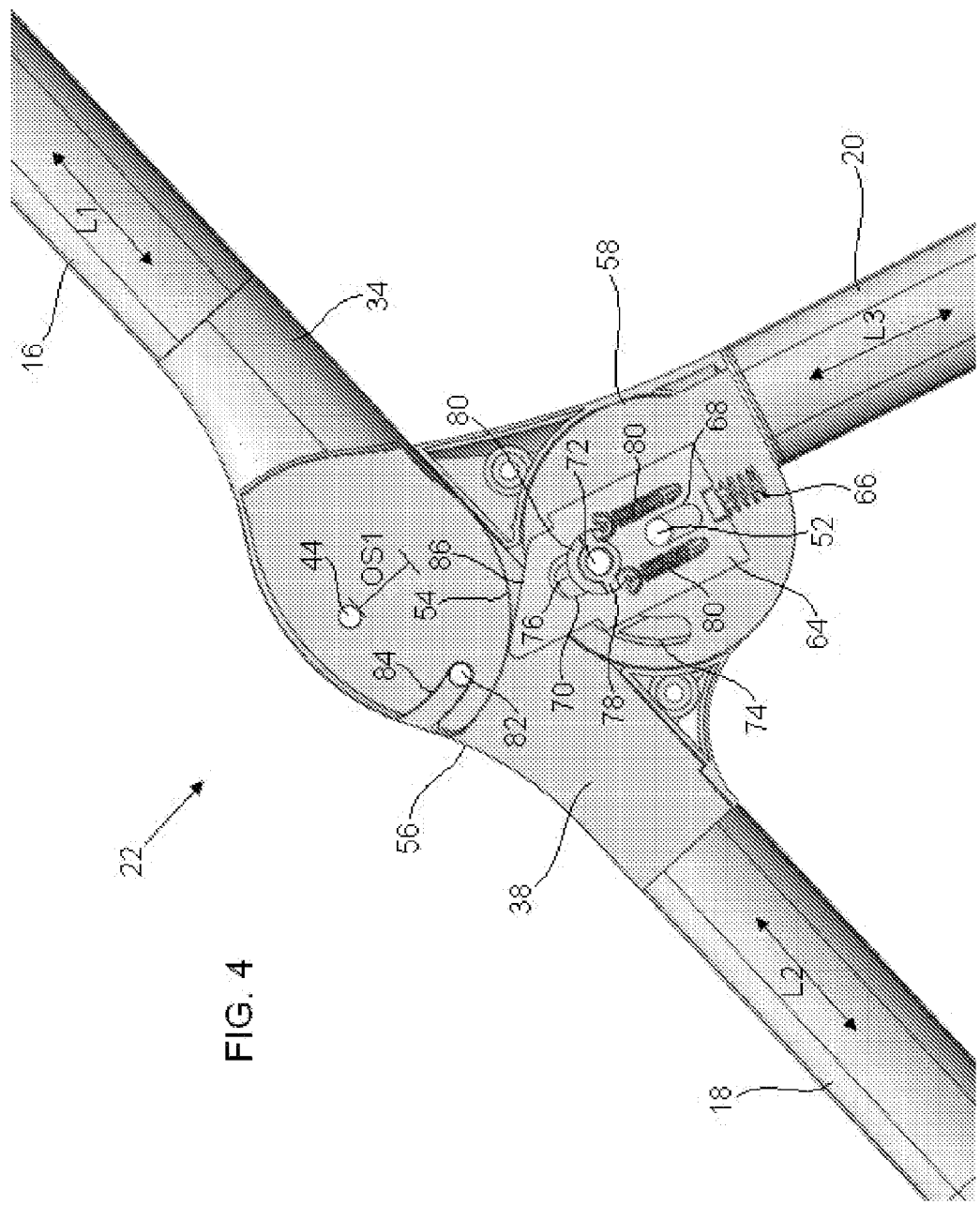
FIG. 4 shows a partial cut-away of the hinge assembly in an unfolded condition.

FIG. 4 shows the hinge assembly in an unfolded condition when the buggy is use. FIG. 4 and the subsequent Figures show the hinge assembly from one side with the second hinge portion 40 removed.

In the unfolded condition of FIG. 4, the longitudinal axis L1 of the first frame member 16 is aligned with the longitudinal axis L2 of the second frame member 18. The first pivot pin 44 is off-set from the aligned axes L1, L2 by an amount OS1 to allow the members to be folded to a parallel condition. The longitudinal axis L3 of the third frame member 20 extends at an angle between about 50 and 120 degrees to the first and second aligned longitudinal axes. In the illustration, axis L3 is angled at about 80 degrees to the second longitudinal axis. The second pivot pin 52 is off-set to allow the third frame to be folded to a parallel condition.

In the unfolded condition, over rotation (i.e. more than 180 degrees) of the first frame member relative to the second frame member is prevented by a pin 82 fixed to the second hinge part which abuts against the end of an arcuate channel 84 in the unfolded condition.

The asymmetric profile 54 of the first hinge part 28 is curved and engages with a tapered surface 86 of the sliding member 64 preventing the sliding member from sliding upwards from its first position as shown to its second position under the bias of the compression springs 66. The second elongate slot 70 of the sliding member is aligned with the locking recess 76 and the locking pin 72 is biased into its first position engaged in the locking recess by tension springs 80 for locking pivotal movement of the third frame member 20.

Figure 5:
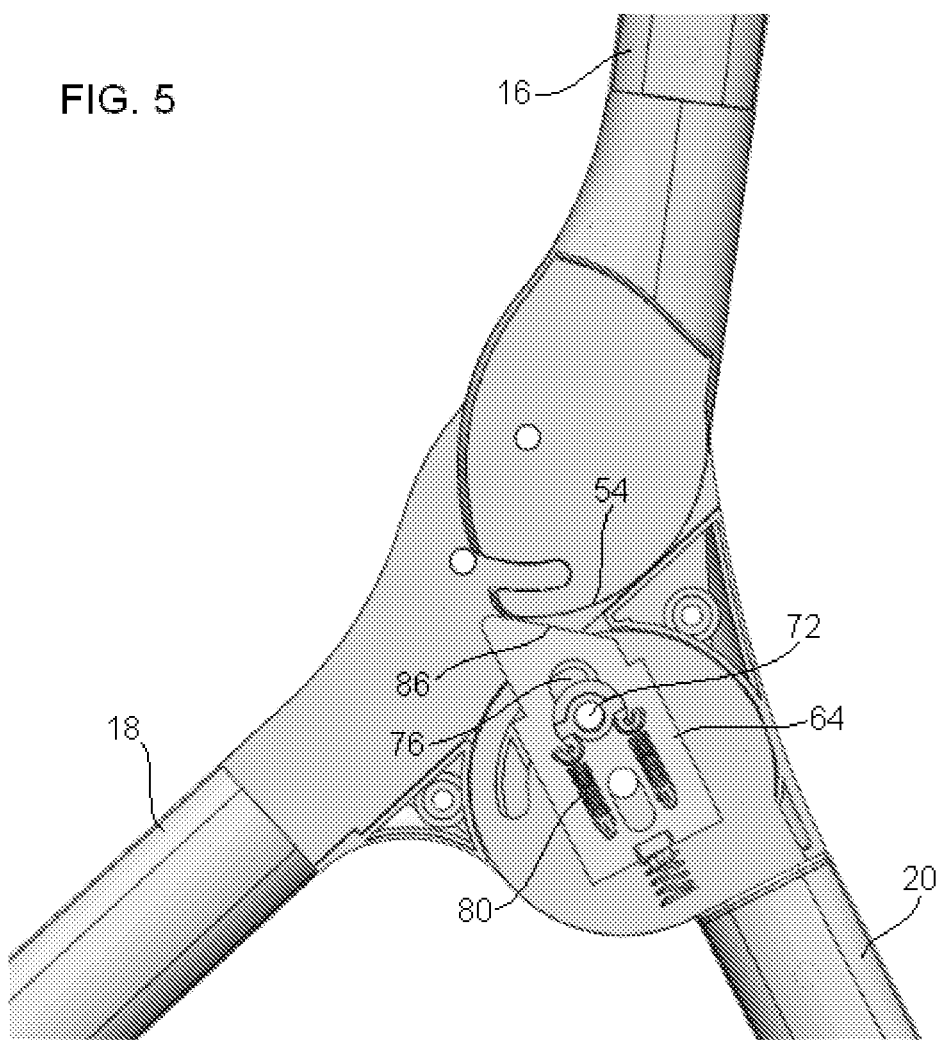
FIGS. 5 and 6 show the hinge assembly during folding.

When it is desired to fold the buggy for storage or transportation, the locking hook 60 is disengaged from recess 62 (see FIG. 3) allowing the handle member 16 to be folded over the hinge assembly 22 towards the front leg member 18. FIG. 5 shows a transitional condition in which the handle member has been partially rotated towards the front leg. The profile 54 of the first hinge part partially rotates and begins to move away from the tapered surface 86 of the sliding member 64. However, in the condition shown in FIG. 5 the sliding member remains in the first position and the tension springs 80 hold the locking pin 72 in the locking recess 76. Initial rotation of the handle member does not therefore unlock the rear leg making it easier to commence the folding operation.

Figure 6:
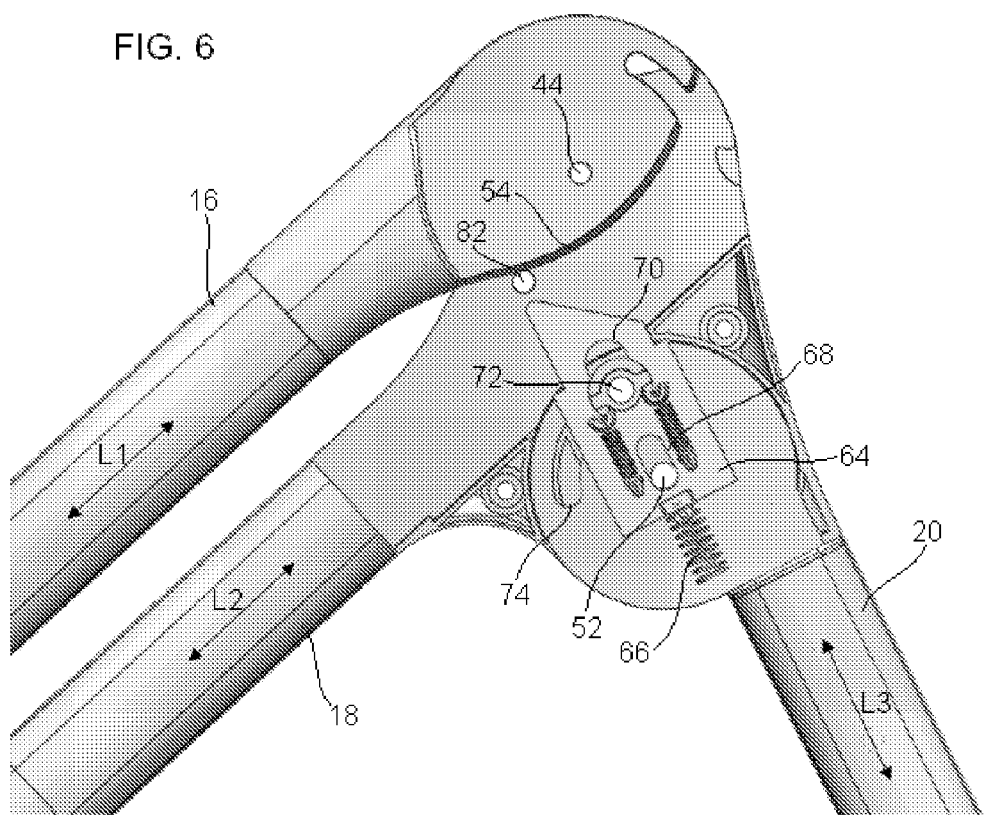

In FIG. 6, the handle member 16 and the front leg are in the folded condition. Longitudinal axes L1 and L2 are now parallel and the pivot pin 44 approximately equidistant from axis L1 and axis L2. Over-rotation of the handle member is prevented by pin 82. The spacing of the profile 54 of the handle member from the second pivot pin 52 is increased sufficiently to allow the sliding member 64 to move with the bias of the compression springs 66 into the second sliding position. The second pivot pin 52 in the first elongate slot 68 prevents sliding movement beyond the second position. The sliding movement of the sliding member causes the locking pin 72 pin to disengage from the locking recess 76 even though the tension springs 80 retain the locking pin in its first position in the elongate slot 70. The third hinge part 46 is now unlocked and the rear leg 20 free to be pivoted to its folded condition.

Figure 7:
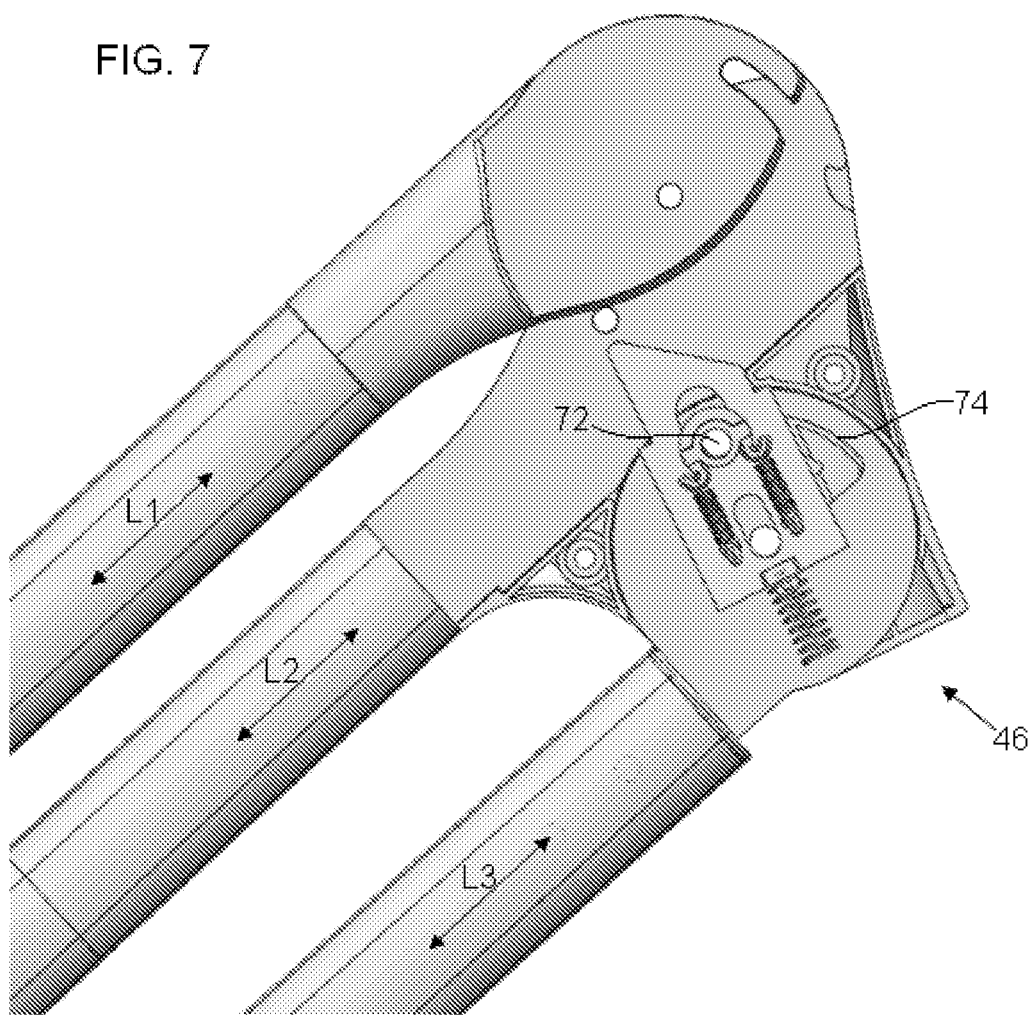
FIG. 7 shows the hinge assembly in a folded condition.

In FIG. 7, the rear leg 20 is pivoted into its folded condition and longitudinal axis L3 is parallel with longitudinal axes L1 and L2. The guide channel 74 guides the locking pin 72 during pivotal movement of the third hinge part 46 between unfolded and folded conditions. The locking pin abuts against the ends of the guide channel to limit pivotal movement beyond the unfolded and folded conditions.

When it is desired to unfold the buggy for use, the handle member 16 or the rear leg 20 may be unfolded in either order. In the simplest case, the folding process described with reference to FIGS. 4 to 7 is reversed whereby the rear leg 20 is unfolded first followed by the handle member 16. The locking pin 72 aligns with the locking recess 76 when the rear leg is rotated to its unfolded condition. Rotation of the handle member moves the sliding member 64 into its first position against the bias of the compressions springs 66 thereby engaging the locking pin in the locking recess and locking the rear leg. Hook member 60 is biased into engagement with recess 62 to lock the handle member and the buggy ready for use.

Figure 8:
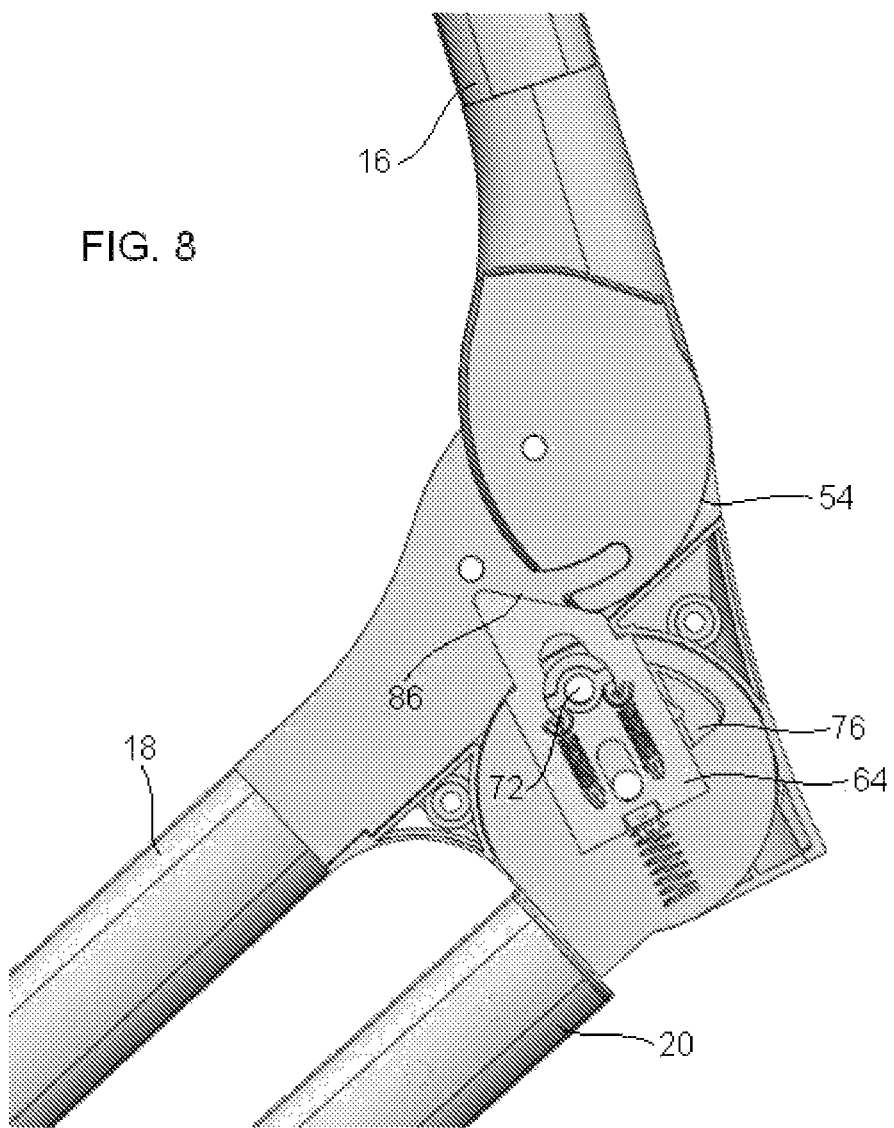
FIGS. 8 and 9 show the hinge assembly during unfolding.
Figure 9:
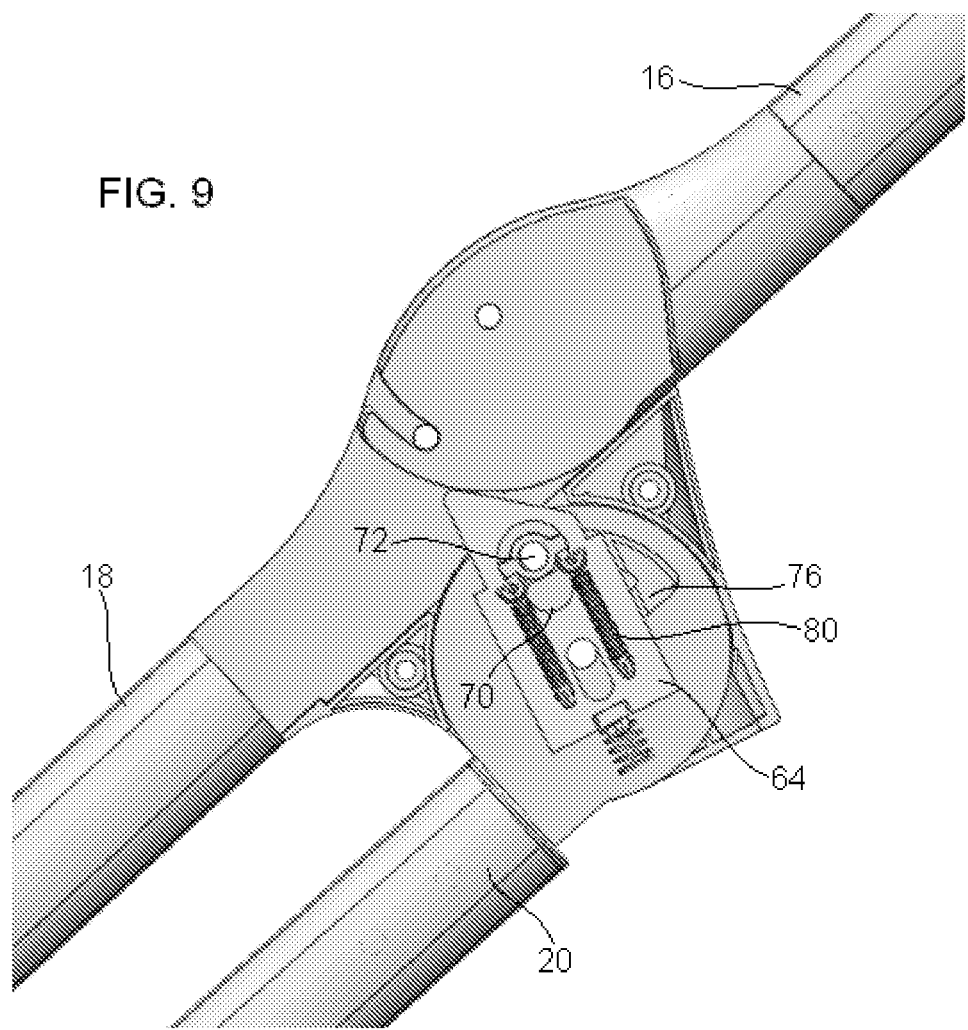

However, a user may instead unfold the handle member first followed by the rear leg and FIGS. 8 and 9 show how this process of unfolding is completed without damaging the buggy.

Figure 10:
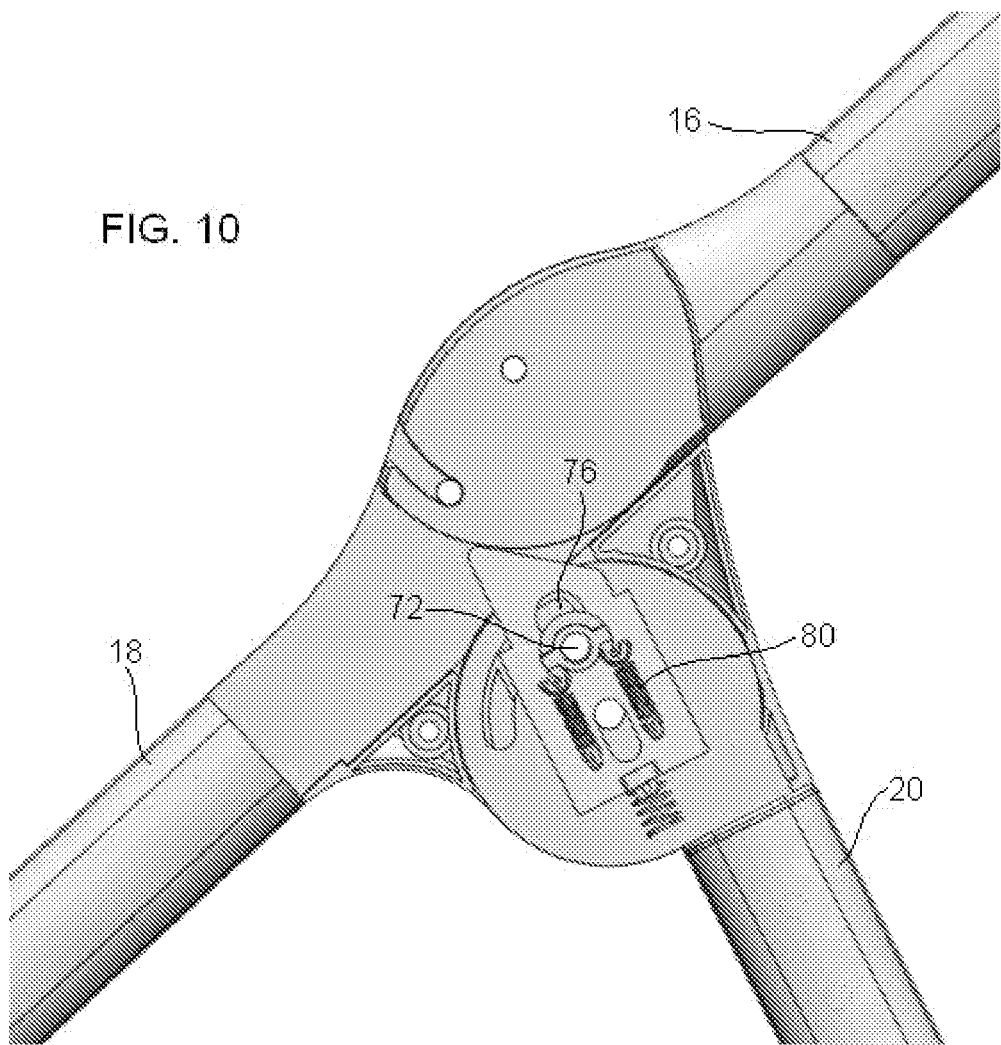
FIG. 10 shows the hinge assembly when unfolded.

FIG. 8 shows a transitional condition between folded and unfolded conditions in which the handle member 16 has been rotated towards its unfolded condition. The profile 54 of the first hinge part 28 engages the tapered surface 86 of the sliding member 64. However, as the rear leg 20 is still in the folded condition the locking pin 72 is not aligned with the locking recess 76. If the locking pin were fixed to the sliding member then continued rotation of the handle member would cause sliding movement of the sliding to its first position and brake or cause damage to the locking pin, sliding member or the hinge assembly more generally. However, in the present arrangement, when the handle member 20 is rotated to its unfolded condition as shown in FIG. 9 (and locked by the hook member 60 in recess 62) and the sliding member 64 is moved to its first position, the locking pin is caused to move to its second position in the second elongate slot 70 against the bias of the tension springs 80. The biasing force on the tension springs is increased when the locking pin is in the second condition. Therefore, when the rear leg 20 is subsequently rotated to its unfolded condition as shown in FIG. 10 and the locking pin is aligned with the locking recess 76, the tension springs 80 pull the locking pin 72 into engagement with the locking recess thereby locking the rear leg.

Figure 11:
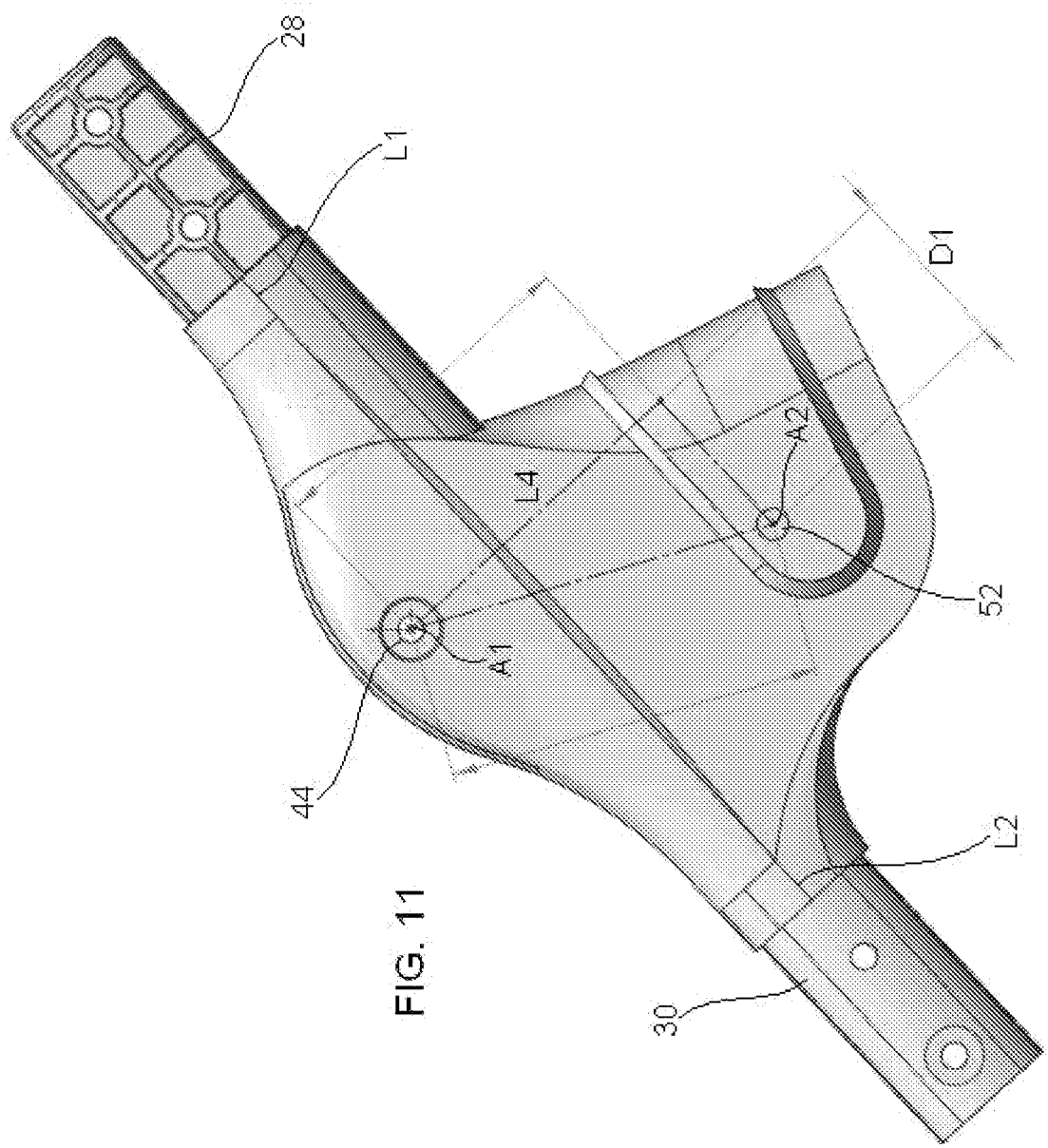
FIG. 11 shows the hinge assembly with relative distances between pivot points.

FIG. 11 shows a hinge assembly 22 with the relative distances between the first and second pivot pins 44, 52. As indicated previously, the longitudinal axis L1 of the first frame member 16 is aligned with the longitudinal axis L2 of the second frame member 18, in the unfolded condition as shown. A line L4 extends perpendicularly to the aligned axes L1, L2 and through the first pivotal axis A1 of the first pivot pin 44. The hinge assembly is arranged so that the axis A2 of the second pivot pin 52 is proximate to the perpendicular line L4 so that when the second and third frame members are in the folded condition and parallel they overlap over a significant and preferably maximum extent. This arrangement provides a compact folded buggy which occupies a reduced space. In FIG. 11, the second pivot pin 52 is a distance D1 from the perpendicular line L4, the distance being less than about 10 to 15% of the length of the front and rear legs of the buggy. If the front and rear legs are each about 500 mm in length, the distance D1 is preferably less than 75 mm, more preferably less than 50 mm and still more preferably between about 30 to 35 mm. In this way, the length of the buggy in the folded condition as shown in FIG. 2 is reduced, whilst maintaining adequate spacing between the front and rear wheels of the buggy when in use.

There have been described and illustrated herein several embodiments of a child support apparatus. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. An apparatus for seating a child comprising a seat and a foldable frame for supporting the seat, the frame comprising:
   a first and a second frame member connected by a hinge assembly and relatively pivotal through substantially 180 degrees between an unfolded condition and a folded condition by pivotal movement of the first frame member over the hinge assembly; and
   a third frame member connected to the hinge assembly and pivotal relative to the first and second frame members by less than 180 degrees between an unfolded condition and a folded condition;
   wherein the hinge assembly comprises:
      a first hinge part fixed to the first frame member and a second hinge part fixed to the second frame member, the first and second hinge parts being arranged to pivot about a first eccentrically mounted pivot pin which is sufficiently off-set above an axis of the first and second frame members to allow the first and second frame members to pivot between an unfolded condition in which the first and second frame members are generally aligned and located on opposite sides of the hinge assembly and a folded condition in which the first and second members are generally parallel and located on the same side of the hinge assembly; and a third hinge part fixed to the third frame member and arranged to pivot about a second pivot pin which is sufficiently off-set from the first pivot pin to allow pivotal movement of the third frame member relative to the first and second frame members between an unfolded condition in which the third frame member is angled relative to the first and second frame members and a folded condition in which the third frame member is generally parallel with the first and second frame members and located on the same side of the hinge assembly as the first and second frame members;

wherein the first hinge part has an asymmetric profile relative to the first pivot pin and pivotal movement of the first and second hinge parts between the unfolded and the folded conditions varies the spacing between the asymmetric profile and the second pivot pin.

2. The apparatus as claimed in claim 1, wherein:
one of the first hinge part or the second hinge part comprises at least two hinge portions arranged alternately with a hinge portion of the other of the hinge parts in an axial direction of the first pivot pin.

3. The apparatus as claimed in claim 1, wherein:
the first hinge part comprises a plurality of first hinge portions and the second hinge part comprises a plurality of second hinge portions arranged alternately with the first hinge portions in an axial direction of the first pivot pin.

4. The apparatus as claimed in claim 1, wherein:
the first and second pivot pins are fixed relative to the second hinge part and the first and the third frame members are pivotal relative to the second frame member.

5. The apparatus as claimed in claim 4, wherein:
the third hinge part comprises at least one third hinge portion which is arranged alternately with at least two second hinge portions of the second hinge part in an axial direction of the second pivot pin.

6. The apparatus as claimed in claim 5, wherein:
the second pivot pin is proximate to a line extending perpendicularly to the aligned longitudinal axes of the first and second frame members and through the first pivot pin for increasing the extent to which the second and third frame members overlap when parallel in the folded condition.

7. The apparatus as claimed in claim 1, wherein:
the first frame member is a handle, the second frame member is a front leg and the third frame member is a rear leg.

8. The apparatus as claimed in claim 7, wherein:
the seat comprises a seat back, a seat base and a material located adjacent a child when seated, and pivotal movement of the handle by approximately 180 degrees to the front leg closes the seat back against the seat base to avoid the material being exposed when in the folded condition.

9. The apparatus as claimed in claim 1, wherein:
pivotal movement of the first member towards the second member unlocks the third member to allow pivotal movement of the third member towards the second member.

10. The apparatus as claimed in claim 1, wherein:
the asymmetric profile of the first hinge part is co-operable with a locking arrangement for locking pivotal movement of the third hinge part, the locking arrangement being responsive to the variation in spacing between the asymmetric profile and the second pivot pin.

11. The apparatus as claimed in claim 10, wherein:
the locking arrangement comprises a sliding member received in the hinge assembly for linear sliding movement and at least one first biasing member for biasing the sliding member towards the asymmetric profile, wherein the asymmetric profile engages the sliding member so that relative pivotal movement of the first and second hinge parts towards an unfolded condition causes the sliding member to move against the bias into a first sliding position and relative pivotal movement of the first and second hinge parts towards a folded condition allows the sliding member to move with the bias into a second sliding position.

12. The apparatus as claimed in claim 11, wherein:
the sliding member carries a locking pin for engagement in a locking recess of the third hinge part when the third frame member is in an unfolded condition.

13. The apparatus as claimed in claim 12, wherein:
the third hinge part comprises a guide channel along which the locking pin is guided during pivotal movement of the third hinge part, the locking recess extending away from the guide channel in a direction of sliding movement of the sliding member to allow movement of the locking pin into the locking recess when the third frame member is in the unfolded condition.

14. The apparatus as claimed in claim 13, wherein:
the sliding member comprises an elongate slot which extends in the direction of sliding movement, the locking pin being received for movement in the elongate slot between first and second locking pin positions and biased by at least one second biasing member into the first locking pin position for engagement with the locking recess when the locking recess is aligned with the elongate slot.

15. The apparatus as claimed in claim 14, wherein:
pivotal movement of the first and second frame members towards the unfolded condition causes sliding movement of the sliding member towards the first sliding position and when the elongate slot is misaligned with the locking recess when the third frame member is not in an unfolded condition, the locking pin is allowed to move towards the second locking pin position in the elongate slot against the bias of the second biasing member.

* * * * *